(12) United States Patent
Barnett (10) Patent No.: US 8,876,140 B2
(45) Date of Patent: Nov. 4, 2014

(54) ADJUSTABLE MOTORCYCLE TRAILER ASSEMBLY

(71) Applicant: Eric Lloyd Barnett, Boca Raton, FL (US)

(72) Inventor: Eric Lloyd Barnett, Boca Raton, FL (US)

(*) Notice: Subject to any disclaimer, the term of this patent is extended or adjusted under 35 U.S.C. 154(b) by 0 days.

(21) Appl. No.: 13/869,608

(22) Filed: Apr. 24, 2013

(65) Prior Publication Data

US 2013/0334790 A1    Dec. 19, 2013

Related U.S. Application Data

(60) Provisional application No. 61/637,709, filed on Apr. 24, 2012.

(51) Int. Cl.
*B60P 3/06*    (2006.01)
*B60P 3/075*   (2006.01)

(52) U.S. Cl.
CPC ................................ *B60P 3/075* (2013.01)
USPC ................... 280/402; 280/401; 280/414.1

(58) Field of Classification Search
USPC ..................................... 280/402, 401, 141.1
See application file for complete search history.

(56) References Cited

U.S. PATENT DOCUMENTS

| | | | |
|---|---|---|---|
| 2,577,246 A | 12/1951 | Hill | |
| 2,688,493 A * | 9/1954 | Rosenberg | 280/651 |
| 2,835,400 A | 5/1958 | Latzke | |
| 2,905,481 A | 9/1959 | Schramm | |
| 2,955,835 A | 10/1960 | Chouinard | |
| 3,768,677 A | 10/1973 | Moss | |
| RE29,006 E * | 10/1976 | Coleman | 40/588 |
| 4,480,851 A * | 11/1984 | St-Pierre | 280/656 |
| 4,490,089 A * | 12/1984 | Welker | 414/483 |
| 4,659,100 A * | 4/1987 | Welker | 280/414.1 |
| 4,846,484 A | 7/1989 | Nekola | |
| 5,474,416 A * | 12/1995 | Rogge et al. | 414/482 |
| 5,560,639 A | 10/1996 | Nowell et al. | |
| 5,810,544 A | 9/1998 | Wellman | |
| 6,113,130 A | 9/2000 | Saulce | |
| 6,447,237 B1 | 9/2002 | Haynes | |
| 6,719,317 B1 * | 4/2004 | Grovender et al. | 280/414.1 |
| 6,749,205 B2 | 6/2004 | Briscese | |
| 6,767,025 B2 * | 7/2004 | Hagen | 280/401 |
| RE41,126 E | 2/2010 | Hurlburt | |
| 7,703,789 B1 | 4/2010 | Mitchell | |
| 8,091,912 B2 * | 1/2012 | Hyslop | 280/414.1 |
| 8,302,986 B1 * | 11/2012 | Shilts | 280/414.1 |
| 8,403,353 B2 * | 3/2013 | Fink | 280/414.1 |

* cited by examiner

*Primary Examiner* — Joseph M Rocca
*Assistant Examiner* — Marlon Arce
(74) *Attorney, Agent, or Firm* — The Concept Law Group, P.A.; Scott D. Smiley; Mark C. Johnson (57) ABSTRACT

A trailer assembly operable to transport vehicles includes a first frame section adapted to be directly selectively couplable to a trailer hitch of an automobile, has at least two spring suspensions coupled thereto, and has at least two tires coupled to the frame section by the at least two spring suspensions. A second frame section is selectively and rotatably coupled to the first frame section and an offset axle is coupled at opposing distal ends thereof to the at least two spring suspensions and coupled along its length to the second frame section.

15 Claims, 11 Drawing Sheets

ADJUSTABLE MOTORCYCLE TRAILER ASSEMBLY

CROSS-REFERENCE TO RELATED APPLICATION

This application claims priority to U.S. Provisional Patent Application No. 61/637,709 filed Apr. 24, 2012, the entirety of which is incorporated by reference.

FIELD OF THE INVENTION

The present invention relates generally to a transportable vehicle trailer, and more particularly relates to a transportable motorcycle trailer assembly that is adjustable to be lowered and raised to load, unload, and transport a vehicle.

BACKGROUND OF THE INVENTION

It is well known that motor vehicles provide transportation for many. Whether it is for business or leisure, there are many situations when owners or users desire those vehicles be transported, i.e. without being driven. This is specifically applicable to motorcycles and personal watercraft. This is partly because most engines have an estimated life span associated with their operation, the vehicle is inoperable, or because of environmental conditions that may subject the vehicle to damage when driven. Most vehicles are transported either commercially or personally. Commercial transportation is typically accomplished through large trucks, vans, or covered trailers.

Commercial transportation is generally expensive and significantly increases in cost based on the type of vehicle being hauled and the distance traveled. As gas continues to increase, so does the costs associated with transportation. It is partly because of these costs that many owners find commercial transportation of their vehicles undesirable, specifically if the vehicle is being hauled over a long distance or if the vehicle requires multiple trips over a short period of time. Moreover, many owners desire to personally supervise the transport of their vehicle. As such, many owners personally transport their vehicles. Taking motorcycles for example, many owners transport their motorcycles on the bed of a pickup truck or trailer. In order to load and unload the motorcycle, the owner is required to utilize the help of ramp. These ramps can be problematic as they require the edges to be aligned, secure, and co-planar with the edge of the bed of truck or trailer to be effectively loaded and unloaded. Failure to achieve these conditions may cause the ramp to slip, thereby causing damage to the motorcycle or the person loading the motorcycle. These ramps are also independent of the trailer, such that the owner is compelled to also buy a ramp that is sized to effectively load the motorcycle. Further, as the ramp is placed at what is generally a steep angle, the motorcycle requires a running start to climb the ramp.

There are some known trailers may be lowered to allow an owner to load and unload a motorcycle without the use of a ramp. Generally, these trailers are unstable when the motorcycle is being loaded and require the trailer to be previously connected to the hitch of a car, van, or truck. Moreover, some known trailers tilt so they can be loaded and unload, but they experience some of the same problems associated with the steep angle as described above. Further, when the motorcycle is unloaded or loaded, the motorcycle trailer abruptly and forcefully rotates toward the direction of the motorcycle. Most known trailers are also unable to distribute the weight toward the back end of the trailer so that the front end may be lifted without much force.

There are some known trailers that are operable to initially load and unload a motorcycle without the use of a steep ramp by utilizing a set of frames connected at two or more pivot points. These trailers fail, however, to keep the motorcycle on a generally planar surface when the trailer is translating from a loading position to a transporting position. As such, the owner is still required to make sure the motorcycle is securely fastened to one of the frames. Furthermore, some known trailers that have an inner and outer frame used to load and unload a motorcycle also have the lifting and lowering mechanism located distally away from the pivot points of the inner and outer frame. These trailers produce a frame configuration that generates an increased mass moment of inertia. Furthermore, an off-balance center of mass is also generally created toward the front end of the trailer. As such, the owner is required to exert more force to lift and lower the frame used to the load the motorcycle. Further, as the sole pivot point of the inner and outer frames is located at the back end of the trailer and the weight of the inner frame is disproportionally located toward the front end, the trailer takes a greater amount of time to be fully lowered and raised. Lastly, some known trailers utilize one or more hydraulic pumps or actuators to lower and raise the trailer, but these trailer systems are costly to purchase and maintain.

Therefore, a need exists to overcome the problems with the prior art as discussed above.

SUMMARY OF THE INVENTION

The invention provides an adjustable motorcycle trailer that overcomes the hereinafore-mentioned disadvantages of the heretofore-known devices and methods of this general type and that lowers to load and unload a motorcycle. The invention advantageously lowers with less effort, provides more stabilization to the motorcycle being loaded, and a more centralized mass when transported.

Although the invention is illustrated and described herein as embodied in an adjustable motorcycle trailer it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

It is an object of the present invention to show a trailer operable to trailer vehicles. The trailer comprises a trailer frame assembly. The trailer frame assembly comprises at least two back wheels, an outer frame having a left side, a right side, and a rear portion. The outer frame couples with the back wheels. An inner frame has a left side, a right side, and a rear portion. The rear portion of the inner frame is slidably coupled with the rear portion of the outer frame. The trailer further comprises an offset axle having a first end and a second end. The offset axle having an offset portion between the first end and the second end. A securement member couples the offset portion of the offset axle to the inner frame. The trailer further comprises a trailer tongue coupled with the trailer frame assembly.

In accordance with an embodiment of the present invention. A trailer assembly operable to transport vehicles includes a first frame section adapted to be directly selectively couplable to a trailer hitch of an automobile, has at least two spring suspensions coupled thereto, and has at least two tires coupled to the frame section by the at least two spring suspensions. A second frame section is selectively and rotatably coupled to the first frame section and an offset axle is coupled at opposing distal ends thereof to the at least two spring suspensions and coupled along its length to the second frame section.

In accordance with a further embodiment, the present invention includes a securing member operable to selectively prevent the second frame section from rotating in relation to the first frame section.

In accordance with yet another embodiment, the present invention includes a closed position where the opposing distal ends of the offset axle are substantially parallel to a middle section of the offset axle and an open position where the middle section of the offset axle is lower than the opposing distal ends of the offset axle.

In accordance with one more embodiment, the present invention includes a winch coupling the first frame section to the second frame section and operable to transition the trailer assembly from the open position to the closed position.

In accordance with still another embodiment, the present invention includes at least two side wheels positioned perpendicular to the at least two tires and operable to move the trailer assembly along a ground surface when the trailer assembly is turned vertically.

In accordance with a further embodiment of the present invention, the at least two springs allow the opposing distal ends of the offset axle to move independent of the first frame section.

Embodiments of the present invention also provide a trailer assembly operable to transport vehicles and includes a trailer frame assembly having at least two main wheels, at least two springs coupling the at least two main wheels to the trailer frame, an outer frame having, a left side, a right side, and a rear portion, the outer frame coupled to the main wheels, and an inner frame having a left side, a right side, and a rear portion, the rear portion of the inner frame being rotatably coupled to the rear portion of the outer frame. An offset axle has first and second opposing distal ends each coupled to one of the at least two springs, the offset axle having an offset portion between the first end and the second end. A securement member couples the offset portion of the offset axle to the inner frame. A trailer tongue is coupled with the trailer frame assembly and a first platform is configured to support at least a front wheel of a vehicle.

It is an object of the present invention to show a trailer frame that has a first platform configured to support at least a front wheel of a vehicle and a second platform disposed at an angle to the first platform for facilitating loading up along an inclined plane.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "coupled." as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the back end of the trailer to the front end of the trailer where the hitch is located. The terms "program," "software application." and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

After review of the specification it may be concluded that the features of the invention are novel, but it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient adjustable vehicle trailer that may be lowered and raised without the use of an external ramp. Embodiments of the invention provide a vehicle trailer having a more centralized moment of inertia as it advantageously utilizes the natural pivot and support points of the wheels.

Figure 1:
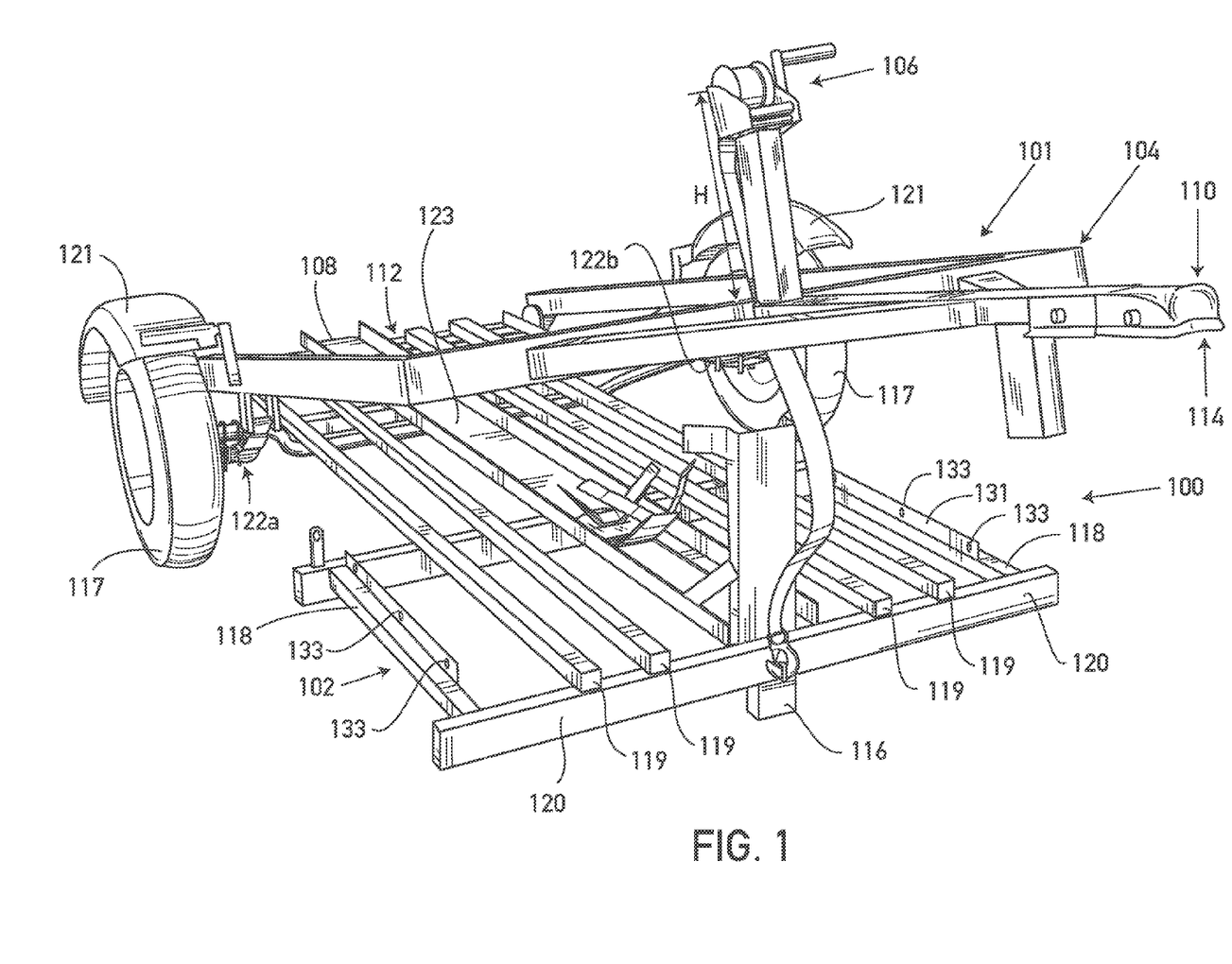
FIG. 1 is a perspective view of a trailer assembly in an open position, the trailer assembly having an outer frame and an inner frame, in accordance with the principles of the present invention.

Referring now to FIG. 1, one embodiment of the present invention is shown in a downward-looking perspective view. FIG. 1 shows several advantageous features of the present invention, but, as will be described below, the invention can be provided in several shapes, sizes, combinations of features and components, and varying numbers and functions of the components. The first example of an adjustable motorcycle trailer assembly 100, as shown in a loading/unloading position in FIG. 1, includes a main frame portion 101 comprising an outer frame 104 assembly and an inner frame 102 assembly. The trailer assembly 100 may include a winch assembly 106 secured to the outer frame 104 that raises and lowers the inner frame 102 into an open and closed position along a translation path. FIG. 1 depicts the inner frame 102 being in the first position such that a motorcycle may be driven onto the platform 108 of the inner frame 102.

Although the trailer assembly 100 is described herein as being configured to support and secure a motorcycle, those skilled in the art may appreciate that the trailer assembly 100 may be configured to load, transport, support, and secure one or more motorcycles, wave runners, cars, and other vehicles. In one embodiment, the outer and inner frames 102, 104 are made with steel tubing. In other embodiments, the frames 102, 104 may be made with aluminum, another metallic alloy, or other material sufficient to support the load of the motor vehicle being transported. The frames 102, 104 may also be made from solid metal, wood, or other materials. The trailer assembly 100 has a front end 110 and back end 112 with a portion 114 of the outer frame 104 shaped to receive a standard-sized trailer hitch. As shown, the trailer assembly 100 advantageously has the ability to support its own weight without being physically coupled to another vehicle or a trailer hitch. The front and back ends 110, 112 may be composed of one or more portions of both frames 102, 104.

The trailer assembly 100 can be seen having two back wheels 1117 on each side of the trailer assembly 100 located toward the back end 112 of the trailer assembly 100. While in the open position, the inner frame 102 may have one or more locations 116 that support the weight from the front end 110 portion of the inner frame 104. The one or more locations 116, in conjunction with the wheels are operable to provide points of support against the ground for the trailer assembly 100. For example, the instant embodiment depicted in FIG. 1 depicts three points of support, however it is contemplated that addition locations 116 for support may be provided, particularly when multiple vehicles will be towed on the main frame 101 or in the case when a single vehicle includes more than two wheels.

Figure 5:
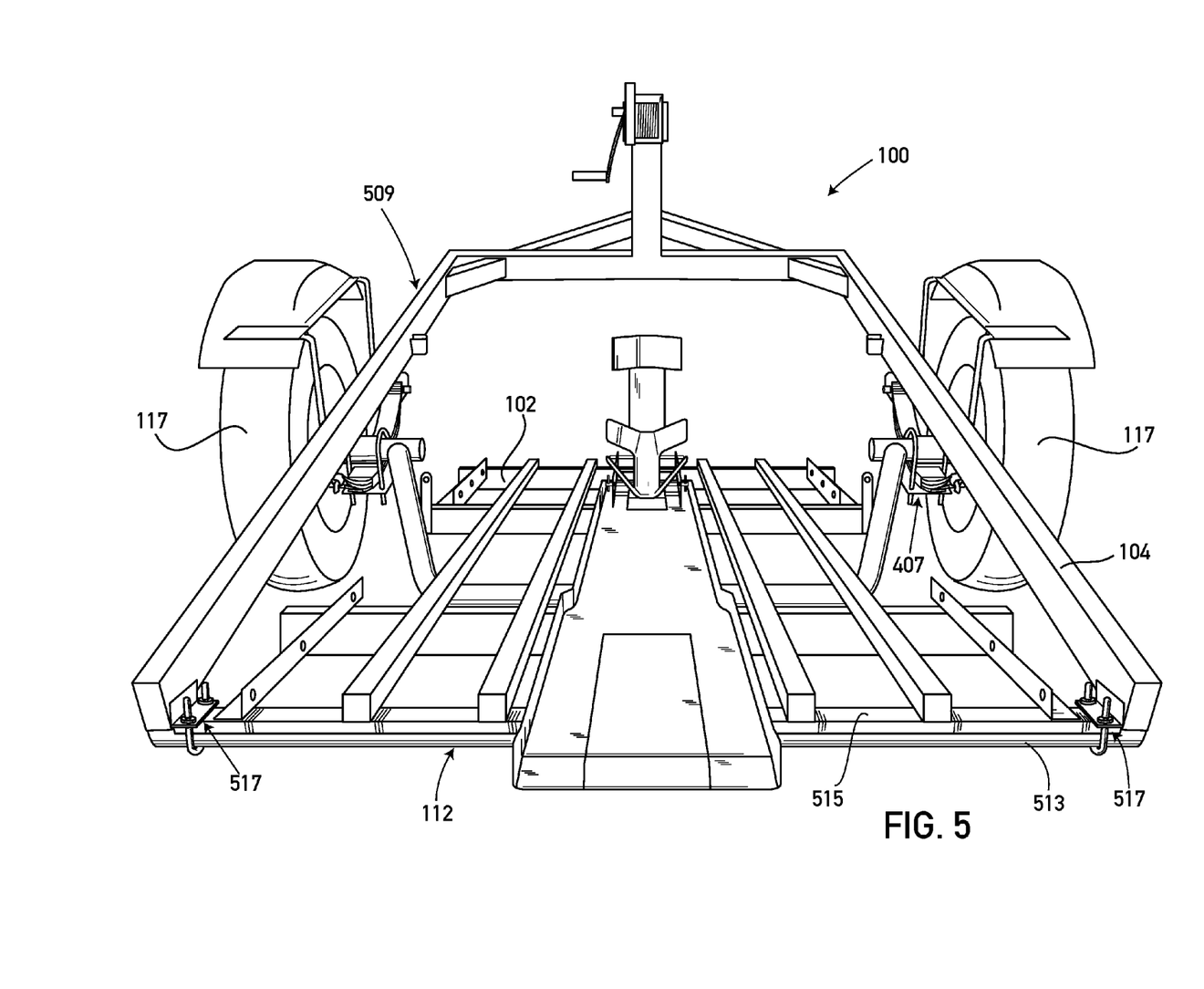
FIG. 5 is a perspective rear view of the trailer assembly shown in FIG. 1 in the open position, in accordance with the principles of the present invention.

The inner frame 102 is shown having multiple inner frame support members running longitudinally, e.g., the first inner frame support member 118, along multiple horizontal support members, e.g. the second inner frame support member 120. The inner frame 102 is further shown to include one or more longitudinal support beams 119. The inner frame additionally has tie down support members 131 that are secured to the inner frame 102 at the front end 110 and the rear end 112 of the frame assembly 100, as depicted in FIGS. 1 and 5. The tie down support members 131 include one or more apertures 133 adapted to allow tie down straps, ropes and the like to couple with the apertures 133 to tie down or otherwise tether the vehicle in place on top of the main frame 101 for the purpose of preventing the vehicle, such as a motorcycle from toppling over during transportation of the trailer.

In one embodiment, the inner frame support members are welded together at one or more location. In other embodiments, the inner frame support members may be extruded or formed into one piece or may be a combination of forming and welding. In another embodiment, the inner frame support members may be bolted, screwed, or otherwise fixed together through any other means known in the art, and may employ a combination of said means to secure the pieces together. As will be described later, the inner frame support members may be utilized to create and facilitate other features of the present invention and may couple together in different configurations. In one embodiment, the outer frame 104 is shown coupled to the suspension 122a-b, located at each back wheel 117 of trailer assembly 100, which is in turn coupled to and separating, the wheel hubs.

FIG. 1 further shows the platform 108 forming a tire alignment track 123. The tire alignment track 123 is adapted to support one or more wheels of a motorcycle, ATV, Trike Motorcycle, golf cart, and the like. The tire alignment track is secured to or formed with, inner frame 102. The tire alignment track includes at least two opposing side walls 125 that extend upwards from the tire alignment track 123.

Still referring to FIG. 1, at least two fenders 121 are coupled with the outer frame 104 and each fender 121 covers at least a portion of the a back wheel 117. The fenders rotate towards the back end 112 of the trailer assembly 100 when the trailer assembly 100 transitions from a closed position to an opened position. In other words, the fenders 121 are configured to rotate back towards the back end 112 of the trailer when the inner frame 102 rests near or against the ground.

Figure 2:
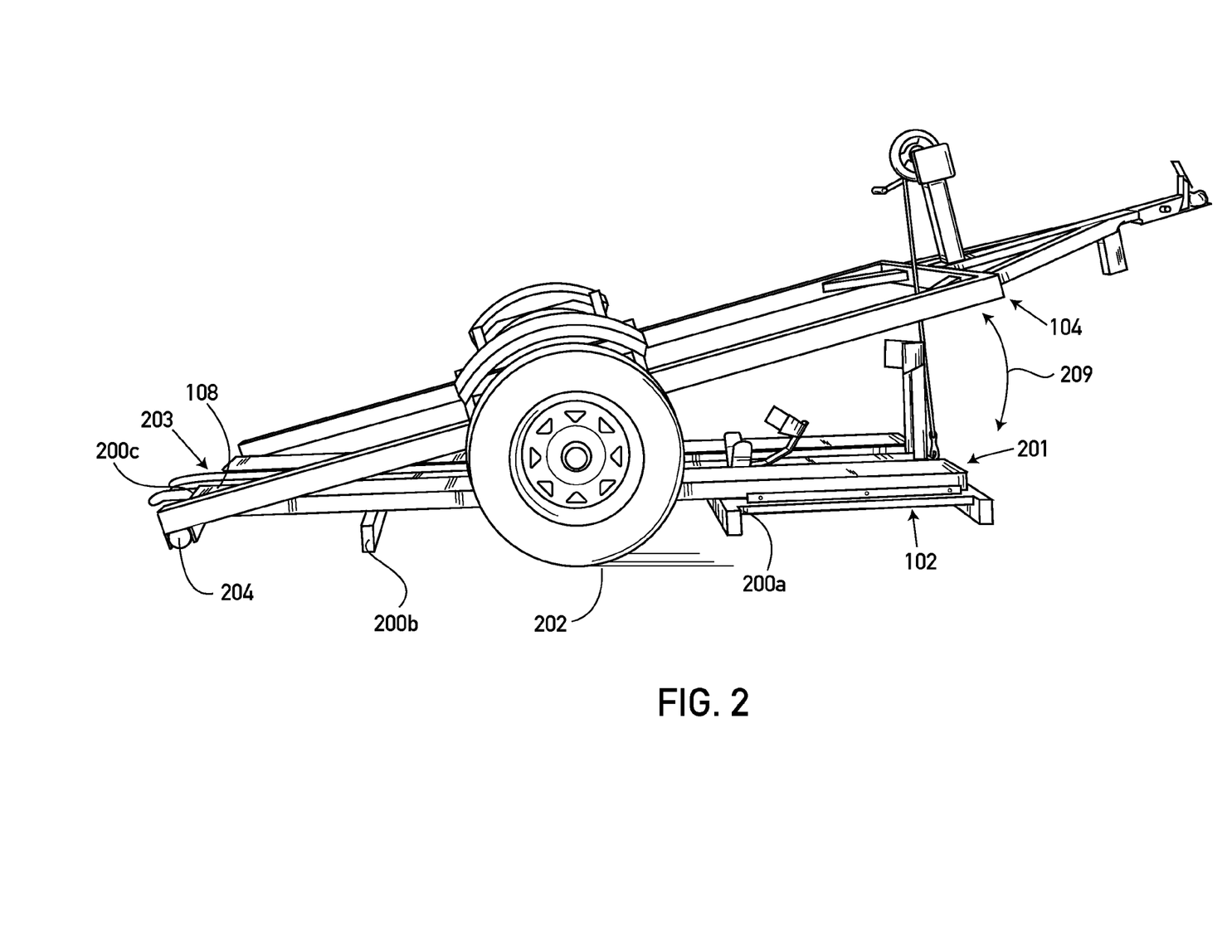
FIG. 2 is a side view of the trailer assembly shown in FIG. 1, in accordance with the principles of the present invention.
Figure 3:
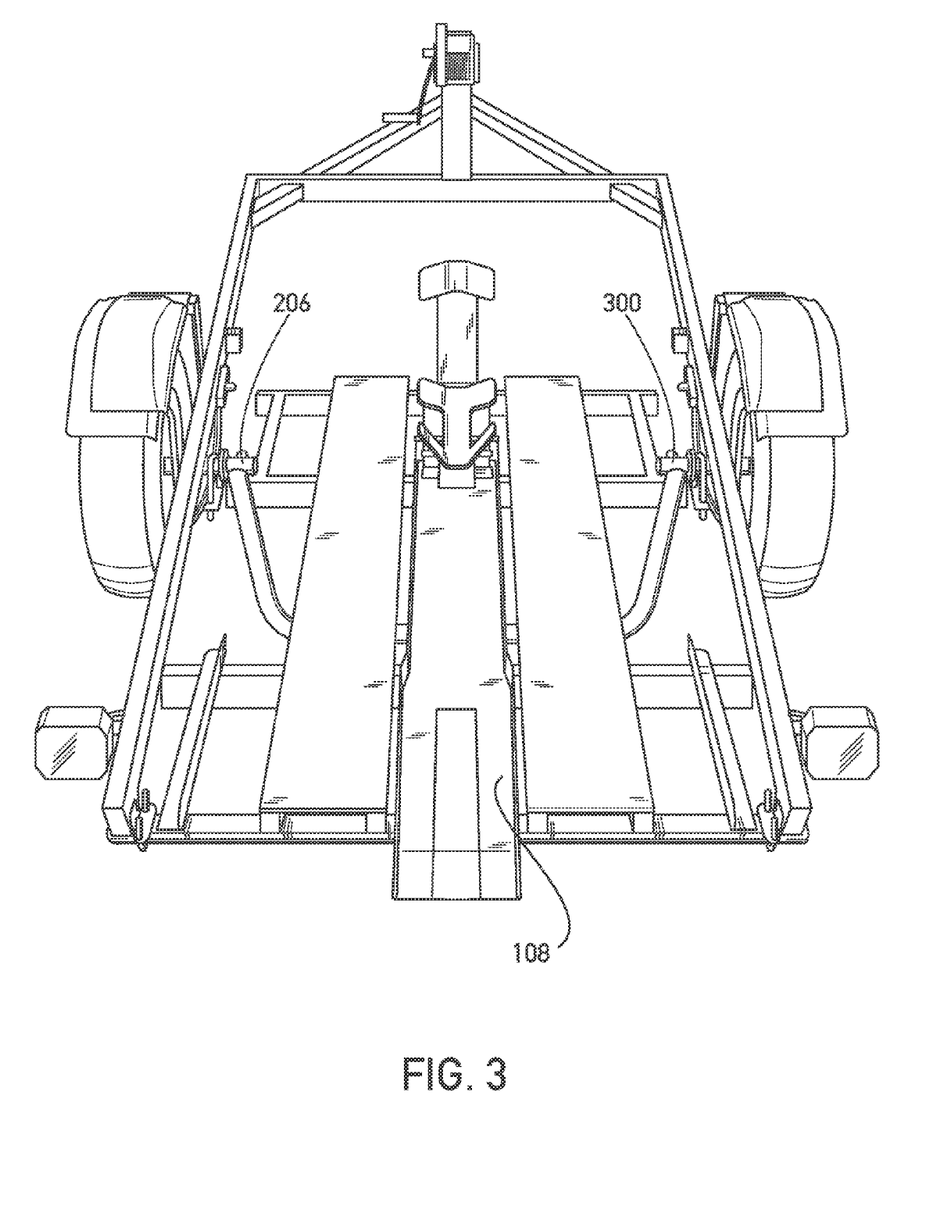
FIG. 3 is a rear perspective view of the trailer assembly shown in FIG. 1, in accordance with the principles of the present invention.

FIGS. 2 and 3 illustrate side and downward-looking perspective views of the trailer assembly 100 from each side for a motorcycle to be supported and restrained by the platform 108 of the inner frame 102. The wheels of each side of the trailer assembly 100 may also have guards are coupled to the outer frame 104 and covering portions of the tire 117. Both FIGS. 2 and 3 also depict certain portions 200a-c of the inner frame 104 contacting with the ground surface 202 while the inner frame is in the open position. As shown, the outer frame 104 extends over the inner frame 102 and has a generally y-shaped frame, when viewed from a top plan view, and an acute angle 209 with respect to the ground surface 202.

Still referring to both FIGS. 2 and 3, the outer and inner frames 102, 104 are shown having an additional pivot point 204 at each side of the frames 102, 104 located generally toward the back end 112 of the trailer assembly 100. The pivot point 204 connects to both the driver side portion of the frame 104 and the passenger side portion of the frame 104. At the pivot point, the inner frame 102 has a "u" or "c" shaped channel that sits over a round pipe attached to the outer frame 104 (See also FIG. 5). A bracket or bearing may be secured above the pivot point 102 Additionally, FIG. 3 shows each side of the trailer assembly 100 having inner frame pivot members 206, 300 coupled to the wheel hub assembly. In one embodiment, these is one continuous piece that is coupled to the inner frame 102. In other embodiments, the inner frame pivot members 206, 300 are separate and each are coupled to the inner frame 102. This advantageously allows the inner frame 102 to move into the second position while the platform 108 surface remains generally planar. This prevents the bike from tilting back when being moved from the open to the closed position and also centralizes the mass moment of inertia of the trailer assembly 100. As such, the inner frame 102 may be moved from the open to the closed position with less effort and more efficiency than those prior-art trailers currently available.

Figure 4:
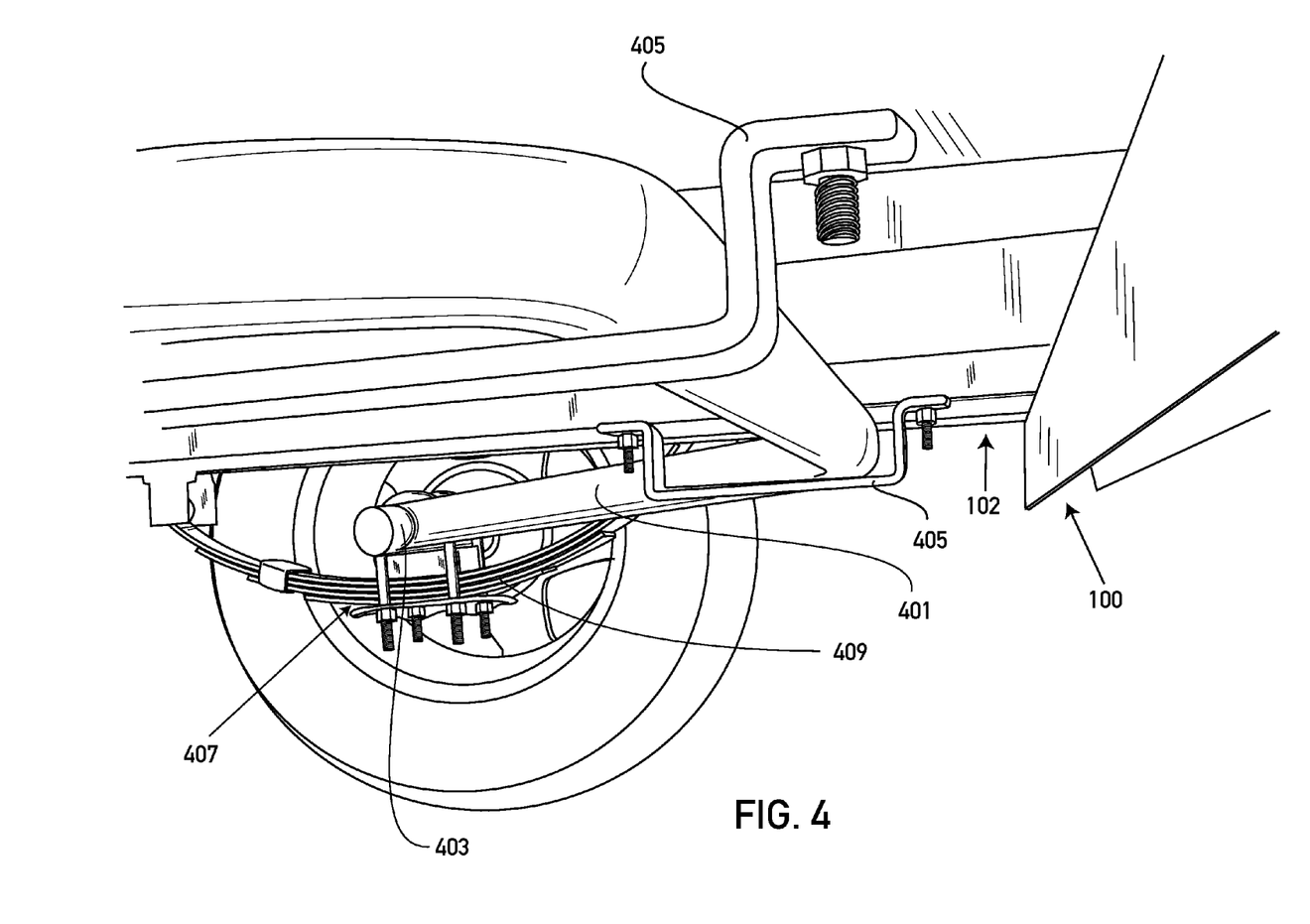
FIG. 4 is an upward-looking perspective view of the trailer assembly having a bracket coupling the offset axle to the inner frame, in accordance with the principles of the present invention.

Referring now to FIG. 4, a bottom view of the trailer assembly 100 is shown depicting an offset axle 401 which includes an offset portion 401 and a non-offset portion 403. As is commonly understood, axles are essential in conjunction with wheels, to allow heavy objects to be moved or facilitate transportation of a trailer. The purpose of the offset axle in the present invention is to allow a front portion 201 and a back portion 203 (see FIG. 2) of the inner frame 102 to be lowered towards the ground for the purpose of loading/unloading vehicles, such as motorcycles, trikes, ATVs and the like. In an embodiment, the front portion 201 and the back portion 203 (see FIG. 2) are lowered substantially flat and/or close to the ground while loading or unloading a vehicle onto the main frame 101 (see FIG. 1). It would not be possible to do this with a straight shaft axle connected to and between the wheels of a trailer assembly because inner frame 102 would be blocked from lowering substantially flat down to the ground by the straight shaft, thereby only permitting tilting the frame around an axis defined by the axle shaft and mimicking the effects commonly found in a seesaw, in which case if one end of the trailer were lowered to the ground, the other end would raise upward. To overcome this problem, the present invention utilizes the offset axel 401 to permit both the front 201 and the back 203 portions of the inner frame 102 to be lowered to the ground below the center point of the back wheels 117.

In operation, letting out slack from the winch, as would be commonly understood in the art, would place a downward force on the offset axle, causing the downward rotation of the distal length 407 of the offset axle and additionally causing the distal length 407 of the offset axle 401 to be pushed towards the ground. An important feature of the instant invention lies in the coupled connection between the offset axle 401 and the inner frame 102. It is advantageous to couple the offset axle 401 to at least a portion of the main frame 101 to prevent the offset axle 401 from hanging on the ground, which is particularly important while towing the trailer assembly 100. It is particularly useful to couple a portion of the offset axle to the inner frame 102 because the transition between a loading/unloading position and a closed ready position causes the offset axle to move in coupled relationship, reduces the amount of user interaction necessary to prevent the offset axle from dragging on the ground, and reduces the costs associated with the manufacture of the trailer.

Still referring to FIG. 4, in the instant embodiment, one or more brackets 405 may be secured to the inner frame 102 to transfer force from the inner frame 102 to the offset axle to cause the distal length of the offset axle to lift upwards, particularly, but not limited to instances where the frame assembly is transitioning between a loading/unloading position to a closed position for towing. The one or more brackets 405 have the added benefit of holding the offset axle upwards in coupled relation with the main frame 101 to prevent the offset axle from hanging downwards. It is particularly problematic when the offset axle is detached from the main frame 101, including the inner frame 102, because the offset axle could drag on the ground, e.g., when a wheel drops into a pot hole, or the offset axle could contact objects on the ground, e.g., speed bumps, or the offset axle could otherwise contact loose debris on roadways. In the embodiment shown in FIG. 4, the brackets secured to the bottom of the inner frame 102 provide sufficient space operable to permit the distal length of the offset axle to slide longitudinally in relation to the inner frame 102. There are a number of problems associated with the offset axle on a trailer frame that the instant invention sought to overcome. For instance, without at least one bracket 405, the distal end of the offset axle would drag along the ground when the trailer is being towed by a vehicle.

Yet still referring to FIG. 4, even if it were possible to forgo the use of a bracket 405 when driving forward, it would not be possible to reverse because an offset axle would rotate downwards and wedge into the ground, completely preventing pushing the trailer backwards towards its rear. Therefore, an important aspect of the instant invention includes a member, or mechanism, such as bracket 405 but not limited to bracket 405, that secures or otherwise couples the offset axle to the inner frame 102 thereby preventing the offset axle from dropping down detached from the inner frame 102 and scraping against the ground, particularly when a vehicle is towing the trailer assembly 100 on roadways. An additionally important aspect of the instant invention includes a coupled connection between the distal length of the offset axle and the inner frame 102 such that switching between a loading/unloading position and a closed position causes the distal length of the offset axle to move in coupled relation with the inner frame 102.

Yet still referring to FIG. 4, the bracket 405 or other securement member, in an embodiment, holds an intermediate portion of the offset axle level with the non-offset portion of the offset axle, in relation to the plane of the ground, when the trailer assembly 100 is in a closed position. In an embodiment, the bracket 405, or other securement member, secures an intermediate portion of the offset axle above the non-offset portion of the offset axle when the main frame 101 is in a closed position and level with the ground.

Yet still referring to FIG. 4, a suspension system for the instant invention is shown utilizing a leaf spring assembly 407 on each of the driver side and passenger side of the trailer. The leaf spring assembly includes one or more leaf springs 409, as is commonly understood in the art. The leaf spring assembly 407 is secured, or otherwise coupled, at or near its ends to the outer frame 104. The leaf spring assembly 407 is secured, or otherwise coupled, at an intermediate point to the offset axle 401 thereby coupling the outer frame 104 to the back wheels 117. As can be seen from the rear view of the trailer assembly 100 in the open position of FIG. 5, the outer frame portion 104 is rotated about the axis defined as the line existing between the center portion of the back wheels 117. The connection of the outer frame 104 to the back wheels 117 causes the back end 112 rotates about a fulcrum when transitioning to the open position.

Referring now to FIG. 5, the outer frame 104 is formed having at least left driver side frame portion 509, a right passenger side frame portion 511, and a rear pivot beam portion 513. The rear pivot beam portion couples the left drive side frame portion 509 with the right passenger side frame portion 511 at the back end 112 of the frame assembly 100. The outer frame portions may be extruded or formed into one piece or may be a combination of forming and welding. In another embodiment, the outer frame portions may be bolted, screwed, or otherwise fixed together through any other means known in the art, and may employ a combination of said means to secure the pieces together.

Yet still referring to FIG. 5, the inner frame 102 includes a u-shaped beam portion 515 located towards the rear end 112 of the frame assembly 100 having a u-shaped inner surface that is slidably disposed against the cylindrical outer surface of the rear pivot beam portion 513 allowing for the u-shaped beam portion 515 and the rear pivot beam portion 513 to slide or otherwise rotate in relation to each other. In a particular embodiment, the rear portion of the outer frame 104 sits at least partially within the u-shaped beam portion and preferably in contact with the u-shaped inner surface.

In one embodiment, the rear pivot beam portion 513 has a cylindrical shape and the u-shaped beam portion 515 has a u-shaped concave inner surface, however it is not so required. Instead, it is merely required that the rear pivot beam portion 513 and the u-shaped beam portion 513 are positioned to slide or otherwise rotate in relation to each other to allow for the opening and closing operation of the frame assembly 100, in accordance with the principles of the present invention. In an embodiment, the u-shaped beam portion 515 and the rear pivot beam 513 may be coupled by attaching a securing member 517, such as a muffler clamp, which would allow for a slidable coupled connection.

In a particular embodiment, it is important to the strength and durability of the invention that the rear pivot beam portion 513 is formed from a single piece of metal and extends across substantially the entire width of the outer frame 104 from left driver side frame portion 509 to right passenger side frame portion 511. In some embodiments, it is important to the structural integrity of the invention that the rear pivot beam is cylindrical and formed from a single length that extends across the entire width of the trailer frame.

Figure 6:
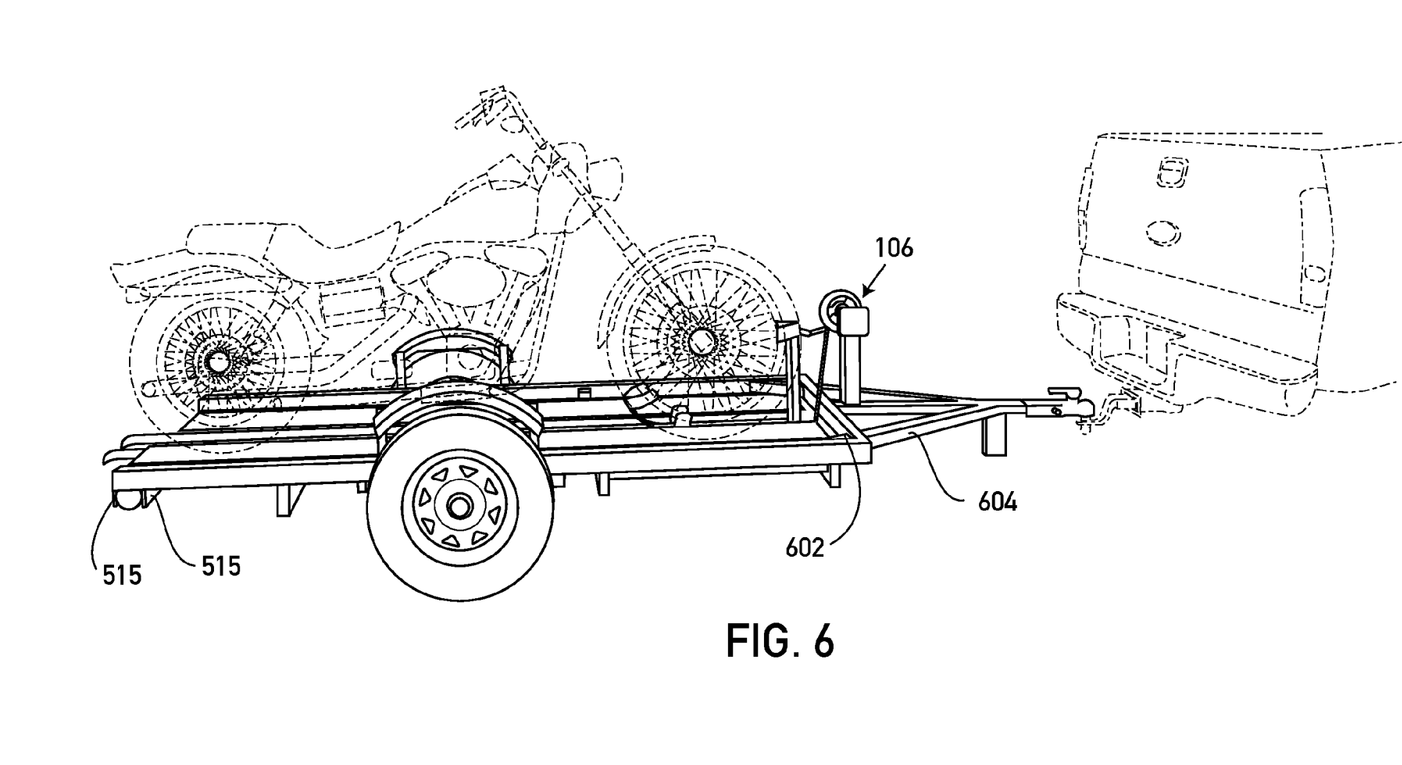
FIG. 6 is a perspective side view of the trailer assembly in a closed position and coupled to a trailer hitch, in accordance with the principles of the present invention.
Figure 7:
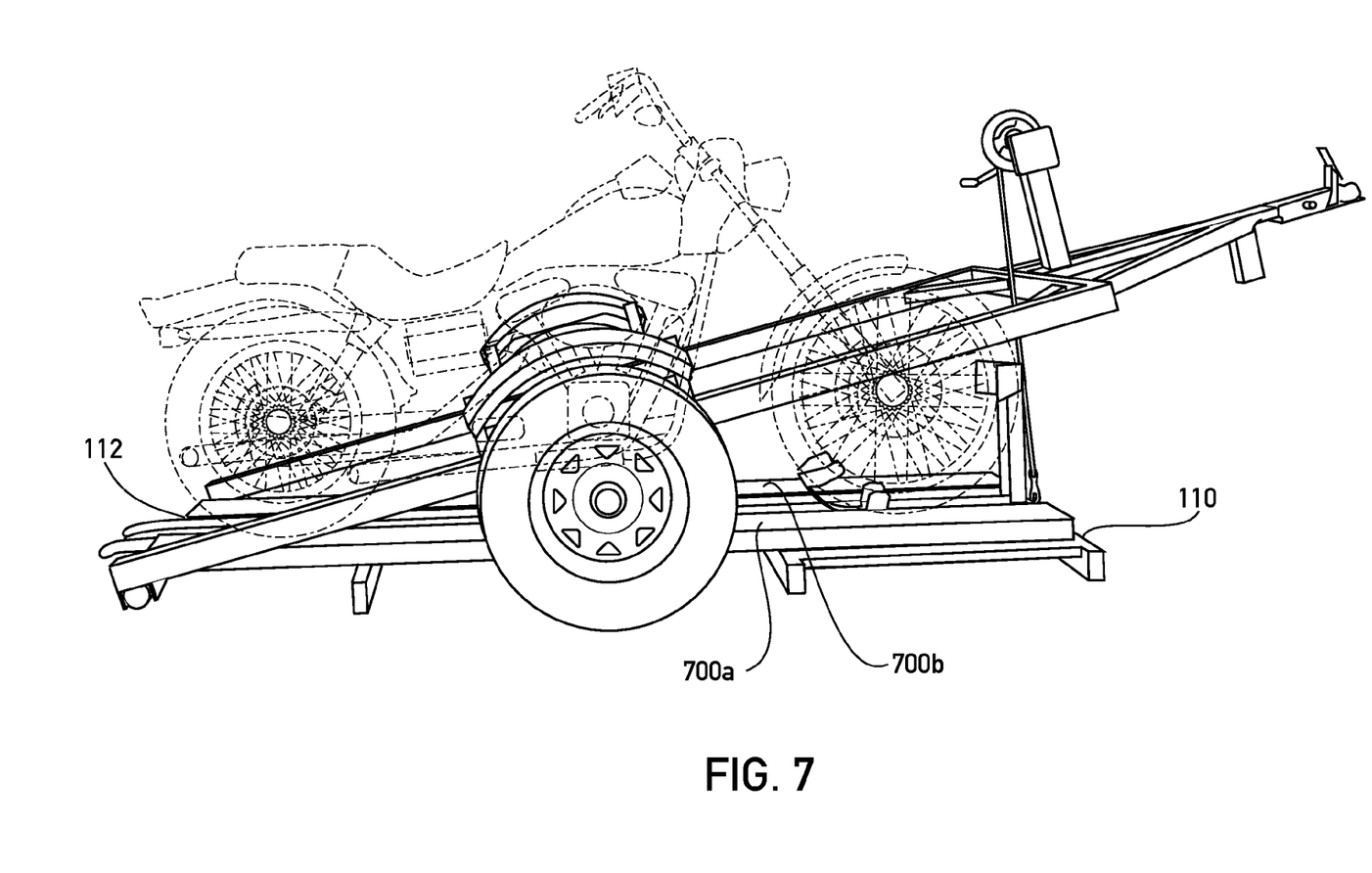
FIG. 7 is a perspective side view of the trailer assembly in an open position shown in FIG. 1 having a vehicle mounted thereon, in accordance with the principles of the present invention.

Referring now to FIGS. 6 and 7, the trailer assembly 100 can be seen in its open and closed positions with the motorcycle loaded onto the platform 108. FIG. 5 depicts the trailer assembly 100 attached to the hitch of secondary motor vehicle (now shown), while FIG. 7 depicts the trailer assembly 100 resting in an open position on the ground surface 202 (see FIG. 2). In other embodiments, the assembly may have one or more other portions that support the inner frame 102 assembly when it is in the closed position. Further, the one or more portions that may be in contact with the ground surface 202, while in either the open or closed positions, may have a rubber insert, or other similar material, extending from the contact portion. The inserts may be permanently affixed or spring loaded to resist impact forces when dropped on the ground and to resist damaging a support surface, such as a garage floor. It should be noted that the trailer assembly 100 also may translate from the open to the closed positions without the use of third tire coupled to the inner frame. The third tire, commonly associated with prior-art trailers, supports and raises the inner frame so it can pivot from the open to the closed position. The trailer assembly 100 may also include one or more reflectors and/or license plate brackets that increase the safety and operability of the assembly when in transport. Also shown is one or more ratchet straps extending from the vehicle to one or more apertures formed on the inner frame 102.

Referring again to FIGS. 1-7, a depiction of views of the front end 110 of the trailer assembly 100 while in various positions along the translation path from the open and closed positions. In one embodiment, shown in FIG. 1, the winch assembly 106 is what translates the inner and outer frames 102, 104 from the open position to the closed position. In other embodiments, the trailer assembly 100 may utilize a pulley system, an actuator, or other method. Further, the winch assembly 106 may be automated with the use of one or more controls that may be integrated with the trailer assembly 100 or operable remotely. The winch assembly 106, because it is generally known in the art, will not be discussed in detail, but generally has a handle used to spin a reel that has a rope, strap, or cable attached thereto. As the handle is spun, the strap lowers or raises the inner frame 102, which in turn, through the pivot points (previously discussed), translates the outer frame 104 from the open and closed positions. As shown, the strap has a fastener located on a distal end that connects to the inner frame 102. The height "H" of the winch assembly 106 is sufficient to raise the back end 112 (shown in FIG. 1) of the inner frame 102 so it does not brush against the ground surface 202 when being transported. Generally, the height "H" is approximately 1 to 1.5 feet, but that may increase or decrease depending on the design. The winch assembly 106 is operable to both lower and raise the inner frame 102 and may also utilize an automatic brake to prevent the strap from unraveling from the reel. Also shown in FIG. 6 is that the outer frame may define an aperture 602 shaped to receive another portion 604 of the outer frame 104. In other embodiments, the portion 604 may be two separate pieces that are coupled, e.g., welded, to the horizontal portion of the frame 104 that defines the aperture 602.

FIG. 7 depicts two diamond plate support panels 700a-b coupled to the inner frame 102 in accordance with one embodiment of the present invention. The support panels 700a-b allow the owner of the motorcycle, or other vehicle, to support his or her feet when driving up the motorcycle. In other embodiments, the width and length of the support panels 700a-b may vary and may not extend to the front end 110 or back end 112 of the inner frame 102, and there may be none, one, or a plurality of supports 700a-b. The diamond plate panels may be configured for allowing a person to support their feet. Alternatively, one or more diamond plate panels may be configured to support at least two wheels of a vehicle having three or more wheels.

Figure 8:
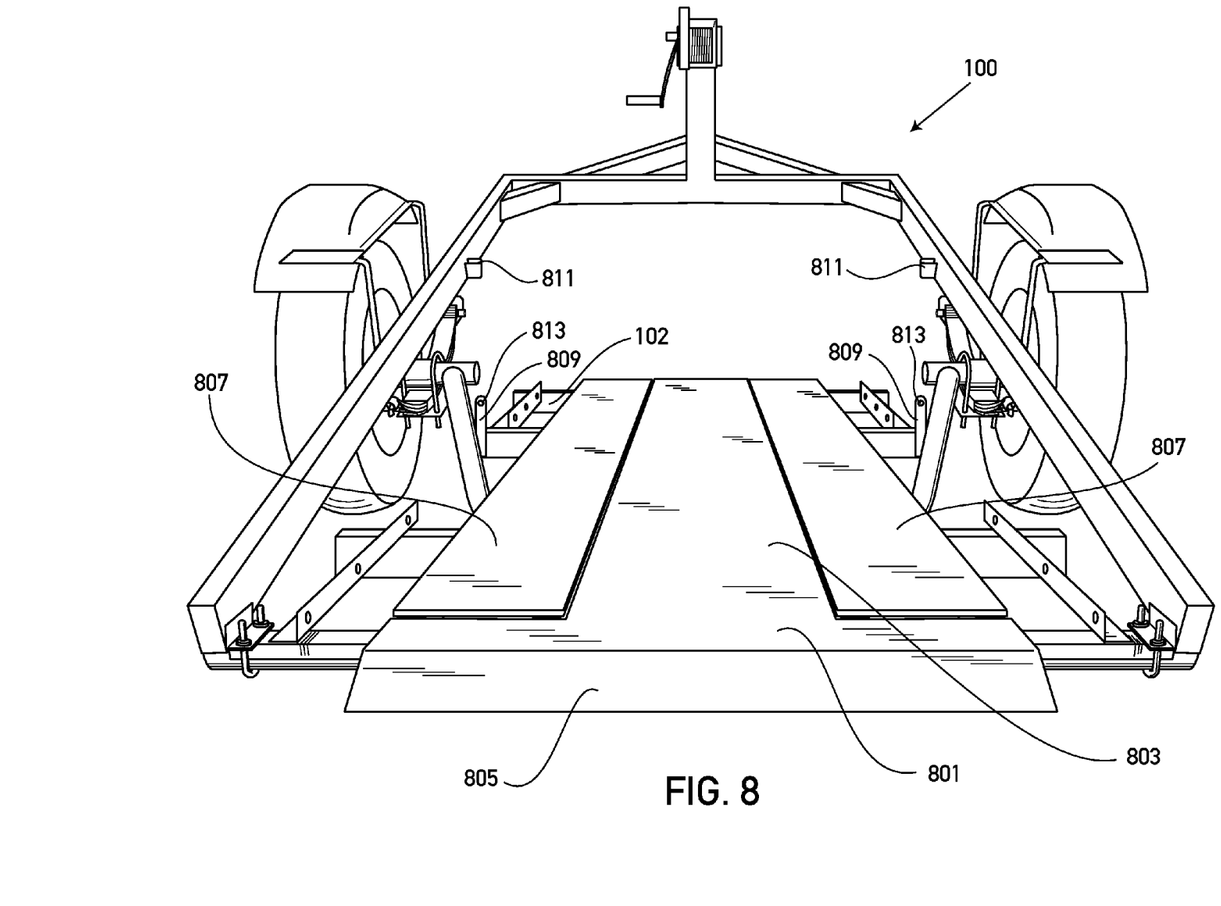
FIG. 8 is a perspective rear view of an embodiment of the trailer assembly having a panel placed on top of the tire alignment track, in accordance with the principles of the present invention.

Referring now to FIG. 8, is shown a trailer assembly 100 having diamond support plates. A central t-shaped support panel 801 is removably secured to the inner frame 102. The t-shaped support panel 801 is placed and removably secured on top of the tire alignment track 123. The t-shaped support panel includes a portion a plane level with the ground and an inclined plane 805 for facilitating running up the inclined plane for easier loading at ground level.

Still referring to FIG. 8, the three diamond support panels, including the t-shaped support panel 801, may be replaced with a single panel. Alternatively, the t-shaped panel could be replaced with a rectangular panel.

Still referring to FIG. 8, an embodiment is shown that has one or more support panels 801. The one or more support panels 807 may include an inclined plane (not shown but similar to plane 805) that facilitates loading a vehicle that first runs up the incline plane 803.

Figure 9:
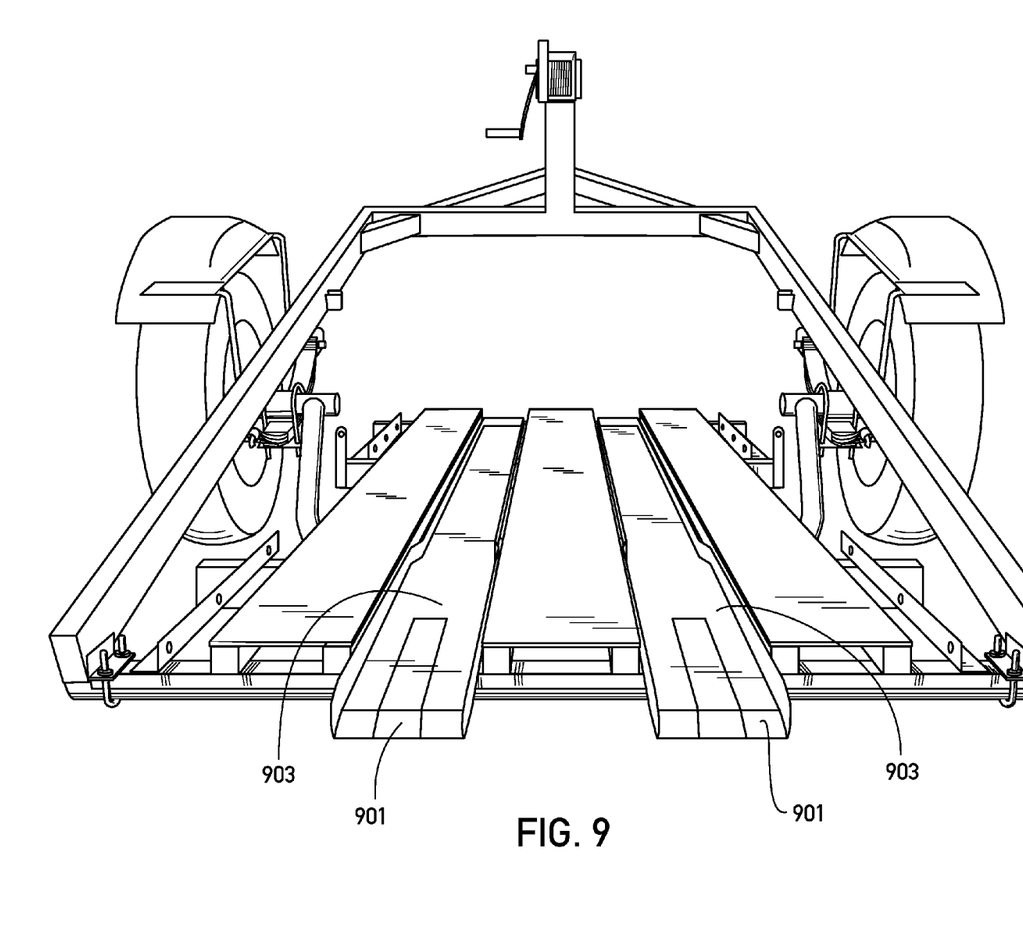
FIG. 9 is a perspective rear view of a trailer assembly having more than one tire alignment track configured for accepting vehicles thereon having any of multiple two wheeled vehicles, and vehicles having three or more wheels, in accordance with the principles of the present invention.

Referring now to FIG. 9, an embodiment is shown having two tire alignment tracks 123. The tire alignment tracks include an inclined plane 901 and a flat plane 903.

Figure 10:
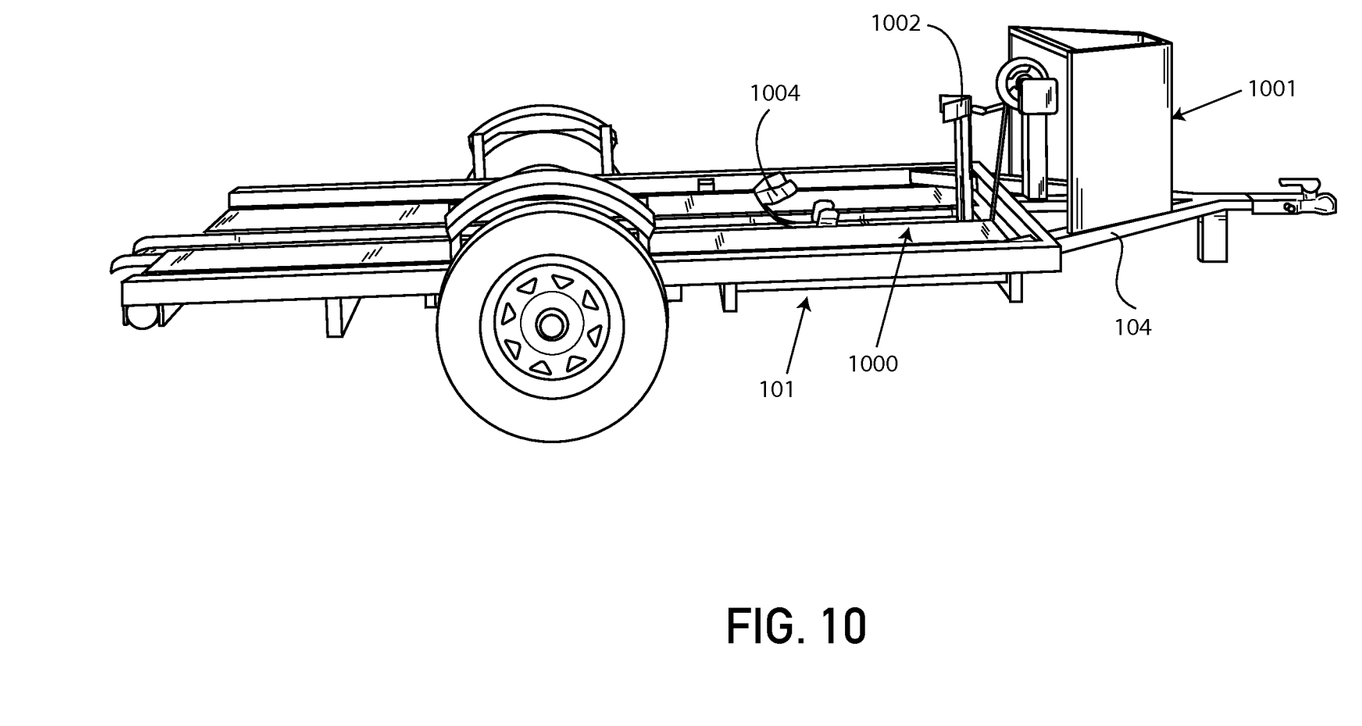
FIG. 10 is a perspective side view of a trailer assembly in a closed position having a wind shield, in accordance with the principles of the present invention.

Referring now to FIG. 10, a perspective view of a motorcycle wind deflector 1001 is shown. The motorcycle wind deflector 1001 is secured with the outer frame 104. The wind deflector 1001 reduces the drag on the vehicle being trailered. The wind deflector 1001 also protects the vehicle, the winch and other parts of the trailer assembly during trailering.

Referring again to FIGS. 3, and 6-7 depicts both the inner and outer frames 102, 104 in multiple positions along the translation path from the first to the second position. FIG. 3 depicts the inner frame pivot members 206, 300 extending from the wheel hub assembly to the inner frame 102. The pivot members 206, 300 can also be seen extending toward the back end 112 (shown in FIG. 9) of the trailer assembly 100. The pivot members 206, 300 are represented as being underneath the inner frame 102, but in other embodiments, the pivot members 206, 300 may be coupled to the side, or a top portion of the inner frame 102. Looking at FIGS. 6 and 7 in combination with one another, the pivot members 206, 300 can be seen having different configurations when in various positions along the translation path from the first to the second positions. It is the pivot members 206, 300 which keep the surface of the inner frame relatively planar as it translates. The weight of the inner frame 102 is disproportionally placed toward the back end 112 of the inner frame 102. This, in combination with the pivot members 206, 300, allows the front and back ends 110, 112 of the inner frame 102 to lower together as part of a linkage system. Because of the pivot members 206, 300, the front and back ends 110, 112 of the inner frame 102 are also raised together. In one embodiment, the back-to-front weight ratio is 1.5 to 1 when no vehicle is loaded. In other embodiments, the weight ratio may be more or less than a 1.5 to 1 ratio as the pivot members 206, 300 may prevent the inner frame 102 from tilting at an angle that may result damage to the motorcycle.

Figure 11:
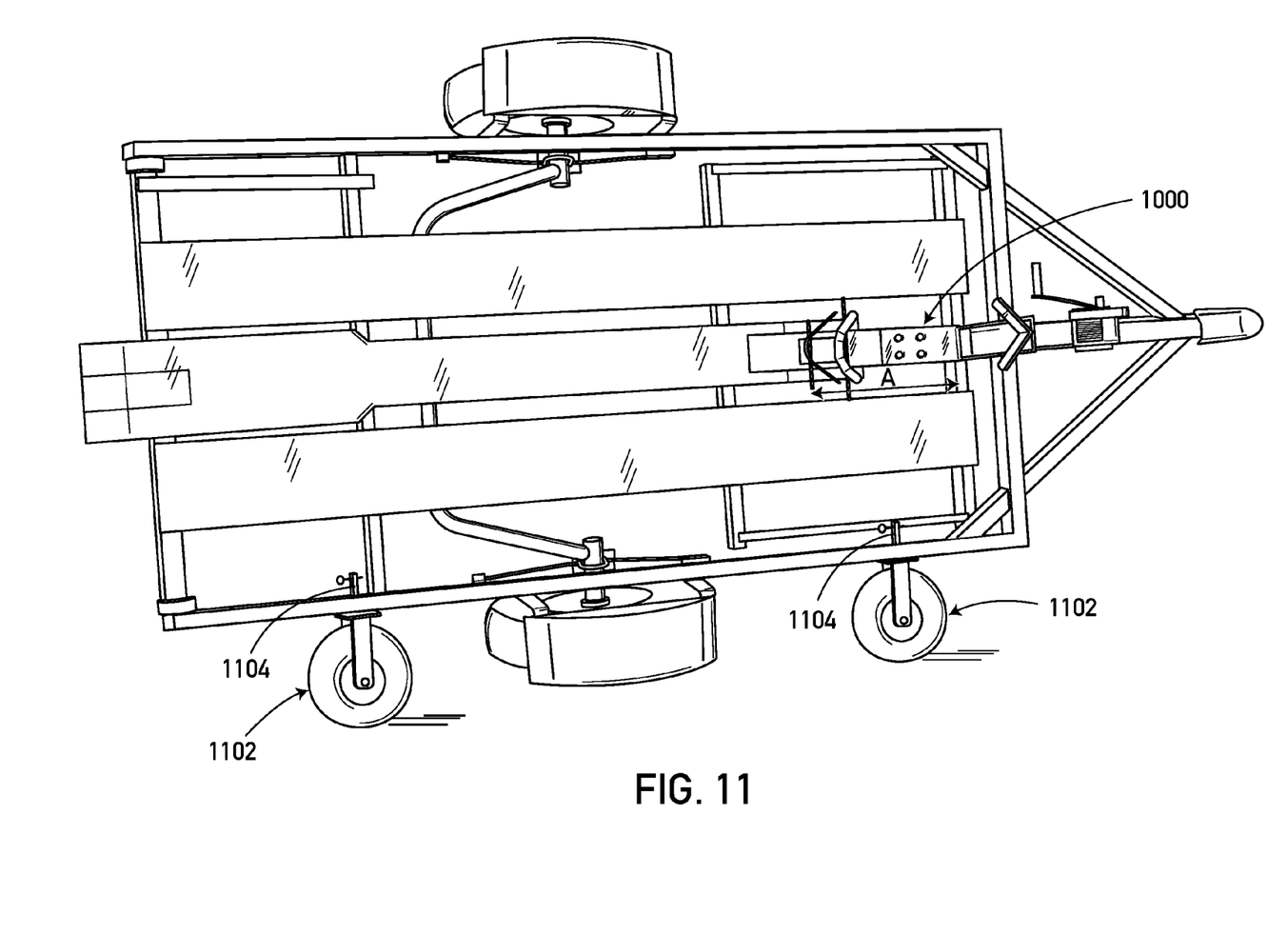
FIG. 11 is a side view of a trailer assembly positioned on its side wheels for maneuvering tight quarters, in accordance with the principles of the present invention.

Referring now to FIGS. 10 and 11, in one embodiment, a portion of the inner frame 102 is shown having apertures 1001 spaced apart along the frame portion. The front wheel locking assembly 1000 may be selectively positioned by the user along the length of the longitudinal support beam for adjusting the equilibrium of the trailer assembly 100 that has a vehicle thereon. For example, motorcycles vary in length and width. In addition, the weight distribution varies for each motorcycle. Accordingly, it is optimal to adjust the distribution of the motorcycle weight on the trailer so that that front end 110 of the trailer assembly 100 can be easily positioned and placed on a trailer hitch of a towing vehicle by the user, which is difficult when the weight the vehicle on the trailer assembly 100 is not balanced with the fulcrum, e.g. the center of the back wheels 117. Adjusting the weight of the vehicle that is secured to the trailer assembly 100 can be accomplished by providing a front wheel locking assembly 1000 that is adjustably positioned along arrow "A" in relation to the length of the inner frame 102. While the instant embodiment depicts a plurality of apertures on both the inner frame 102 and the front wheel locking assembly 1000 to facilitate securement by way of nuts and bolts, the invention is not limited to this type of connection. Instead, it is merely required that the point at which the front wheel locking assembly 1000 is secured to the inner frame 102 can be adjusted by the user to alter the weight distribution about the fulcrum.

Referring now to FIGS. 10 and 11, in one embodiment, the trailer assembly 100, more specifically, the inner frame 102, has a front wheel locking assembly 1000 as shown in FIGS. 10 and 11. To restrain the front wheel of a motorcycle the wheel locking assembly 1000 can be seen having a horizontal restraining portion 1002 and a vertical restraining portion 1004. When the motorcycle is loaded onto the platform 108, the weight of the wheel rotates the vertical restraining portion 1004 such that a portion of the wheel and restraining portion 1004 move into a position where at least a portion is within the aperture 1004 defined by the platform 108. The vertical restraining portion 1004 may be rotatably coupled to the inner frame 102 using a pin with clip on each side. When the motorcycle is being removed from the platform 108, the vertical restraining portion 1004 rotates back toward the back end 112 (shown in FIG. 9) of the inner frame 102. In some embodiments, this may be a typical R-clip, a linchpin, or the like. In other embodiments, the trailer assembly 100 may not have a wheel locking assembly 1000, depending on the vehicle being restrained, or may have more than one locking assembly 1000.

Referring again to FIG. 8 depicting portion 809 of the inner frame 102 extruding in a direction upwardly from the top surface of the platform 108 in accord with another embodiment of the present invention. The portion 809 is shaped to fit within an aperture 811 defined by the outer frame 104. The inner frame portion 809 protrudes out of the aperture 1106 (not pictured) and being retained by a hitch pin (not shown) with an R-clip inserted a hole 813 defined by the inner frame portion 809. In other embodiments, the location of the inner frame portion 809 and aperture 811 may be located in other locations or other similar fastening clips may be utilized, e.g., linchpin. In further embodiments, the inner frame 102 and outer frame 104 are fastened together when in second position by other means or the winch assembly 106 may only support the weight of the inner frame 102.

Another feature of the present invention, depicted in FIG. 11, is a set of side wheels 1102 that are removably-couplable to a portion of the inner or outer frames 102, 104 of the trailer assembly 100. As the weight of the trailer assembly 100 may be beneficially portioned toward the back end 112 of the trailer assembly 100, the front end 110 may be picked up with little three. The side wheels 1102, however, provide the ability for the owner to roll the trailer assembly 100 without having to pick up the front end 110. As such, the set wheels 1102 may be removed and inserted into a portion of the frames 102, 104. The wheels 1102 may be coupled also using a linchpin, R-clip, or other similar attaching mechanism.

Still referring to FIG. 11, the set of side wheels 1102, in a particular embodiment, include a wheel stem shaped to prevent rotation of the stem when secured to the main frame 101. In a particular example, the outer frame 104 has a square aperture adapted to accept at least a portion of a square shaped wheel stem, and further allows the square shaped wheel stem 1104 to pass through the square shaped aperture. An aperture on the wheel stem allows a pin to be removably inserted therethrough to couple the side wheel 1102 to the outer frame 104. The side wheels 1102 are configured to be attached outer frame 104 to allow the user to tip the trailer from its back wheels 117 onto the side wheels 1102 allowing for the easy transportation of the trailer, particularly in tight areas, such as rolling into a garage, storage unit, or other tight spaces.

Referring again to FIG. 1 also depicting support members 131 with apertures that may be used to attach a strap, such as a ratchet tie down, (not pictured) that is used to securely fasten the motorcycle.

Referring again to FIG. 5 is shown depicting the trailer assembly 100 when in its second position. The pivot member 206 can also be seen coupled to a portion of the wheel hub. When in the second position, the pivot member 206 may slant downwardly and inwardly toward the inner frame 102 to create a part of the linkage system that defines the translation path from the first to the second positions of the inner and outer frames 102, 104.

In one embodiment, depicted in FIGS. 1, 3, 5-11, the back end 112 of the trailer assembly 100 is shown with the platform 108 having a portion angled downwardly to assist in the removal and inserting of the motorcycle. Also shown is the outer frame 104 coupled to the inner frame 102 at the rear to create another pivot point in the linkage assembly of the trailer assembly 100. The pivot point between the inner and outer frames 102, 104 may be accomplished with a hinge-like mechanism or the like. FIG. 3 illustrates the other pivot member 300 on the right side of the trailer assembly 100.

Referring again to FIGS. 1 and 4 which depict an embodiment of the trailer assembly 100 when in the closed and open positions respectively. The figures specifically focus on the portions 809 of the inner frame 102 used to couple the inner frame 102 to the outer frame 104 and the suspension assembly 122*a-b*. In one embodiment, the trailer incorporates in the unique pivoting design with the use of a leaf spring suspension 122*a-b* on each side of the trailer assembly 100. This provides superior support and comfort for the trailer when supporting the weight of the motorcycle. The tension of the springs may vary and in other embodiments, one or more shocks may also be utilized. Moreover, a torsion bar suspension, a half leaf suspension, or other suspension assemblies may be utilized. It should also be noted that the suspension 122*a-b* may uniquely rotate with the outer frame 104 when the frame assembly 100 transitions between and open and closed position.

In further embodiments of the present invention, a cover may also be attached to the outer frame 104 or inner frame 102 of the trailer assembly 100 which would substantially enclose the vehicle being transported. The cover may protect the vehicle from environmental conditions and debris that may damage it.

A portable motorcycle trailer has been disclosed that invention provides a novel and efficient adjustable vehicle trailer that may be lowered and raised without the use of an external ramp. The trailer has a more centralized moment of inertia that advantageously utilizes the wheels of the trailer as a natural pivot and support point. The trailer raises and lowers without a steep angle commonly associated with trailers utilizing a winch-like assembly that lowers and raises the inner frame.

What is claimed:

1. A trailer assembly operable to transport vehicles, the trailer assembly comprising:
    a first frame section:
        adapted to be directly selectively couplable to a trailer hitch of an automobile;
        having at least two spring suspensions coupled thereto; and
        having at least two tires coupled to the frame section by the at least two spring suspensions;
    a second frame section selectively and rotatably coupled to the first frame section;
    a first platform coupled to the second frame section, the first platform configured to support at least a front wheel of a vehicle;
    a second platform disposed at an angle to the first platform for facilitating loading of a vehicle along an inclined plane; and
    an offset axle:
        coupled at opposing distal ends thereof to the at least two spring suspensions; and
        coupled along its length to the second frame section.

2. The trailer assembly according to claim 1, further comprising:
    a securing member operable to selectively prevent the second frame section from rotating in relation to the first frame section.

3. The trailer assembly according to claim 1, further comprising:
    a closed position where the opposing distal ends of the offset axle are substantially parallel to a middle section of the offset axle; and
    an open position where the middle section of the offset axle is lower than the opposing distal ends of the offset axle.

4. The trailer assembly according to claim 3, further comprising:
    a winch coupling the first frame section to the second frame section and operable to transition the trailer assembly from the open position to the closed position.

5. The trailer assembly according to claim 2, further comprising:
    at least two side wheels positioned perpendicular to the at least two tires and operable to move the trailer assembly along a ground surface when the trailer assembly is turned vertically.

6. The trailer assembly according to claim 3, wherein the at least two springs allow the opposing distal ends of the offset axle to move independent of the first frame section.

7. A trailer assembly operable to transport vehicles, the trailer assembly comprising:
    a trailer frame assembly comprising:
        at least two main wheels;
        at least two springs coupling the at least two main wheels to the trailer frame;
        an outer frame having, a left side, a right side, and a rear portion, the outer frame coupled to the main wheels; and
        an inner frame having a left side, a right side, and a rear portion, the rear portion of the inner frame being rotatably coupled to the rear portion of the outer frame;
    an offset axle having first and second opposing distal ends each coupled to one of the at least two springs, the offset axle having an offset portion between the first end and the second end;
    a securement member coupling the offset portion of the offset axle to the inner frame both in an open and a closed position of the trailer assembly;
    a trailer tongue coupled with the trailer frame assembly; and
    a first platform configured to support at least a front wheel of a vehicle.

8. The trailer assembly according to claim 7, further comprising:
    a second platform disposed at an angle to the first platform for facilitating loading of a vehicle along an inclined plane.

9. The trailer assembly according to claim 7, further comprising:

at least two side wheels positioned perpendicular to the at least two main wheels and operable to move the trailer assembly along a ground surface when the trailer assembly is turned vertically.

10. The trailer assembly according to claim 7, further comprising:
a securing member operable to selectively prevent the inner frame from rotating in relation to the outer frame.

11. The trailer assembly according to claim 7, further comprising:
a closed position where the opposing distal ends of the offset axle are substantially parallel to a middle section of the offset axle; and
an open position where the middle section of the offset axle is lower than the opposing distal ends of the offset axle.

12. The trailer assembly according to claim 11, further comprising:
a winch coupling the inner frame to the outer frame and operable to transition the trailer assembly from the open position to the closed position.

13. The trailer assembly according to claim 7, wherein the at least two springs allow the opposing distal ends of the offset axle to move independent of the inner frame.

14. A trailer operable to be tilted on its side and rolled in tight storage spaces, the trailer comprising:
a trailer frame assembly comprising:
a frame;
at least two back wheels; and
at least two side wheels positioned perpendicular to the back wheels and spaced apart along a longitudinal length of the trailer frame assembly, the at least two side wheels operably configured to move the trailer frame in a direction substantially parallel along a ground surface without the at least two side wheels leaving the ground and when the trailer assembly is turned vertically.

15. The trailer of claim 14 further comprising:
the trailer frame assembly further comprising:
an outer frame having, a left side, a right side, and a rear portion;
an inner frame having a left side, a right side, and a rear portion, the rear portion of the inner frame is slidably coupled with the rear portion of the outer frame;
an offset axle having a first end and a second end, the offset axle having an intermediate length between the first end and the second end;
a securement member couples the intermediate length of the offset axle to the inner frame; and
a trailer tongue coupled with the trailer frame assembly.

* * * * *